INVENTORS
V.A. RAYBURN
D.C. ROBSON
BY
ATTORNEY

Oct. 19, 1948.   V. A. RAYBURN ET AL   2,451,975
CONVEYER
Filed Dec. 21, 1945   8 Sheets-Sheet 2

INVENTORS
V.A. RAYBURN
D.C. ROBSON
BY
ATTORNEY

INVENTORS
V.A. RAYBURN
D.C. ROBSON

ATTORNEY

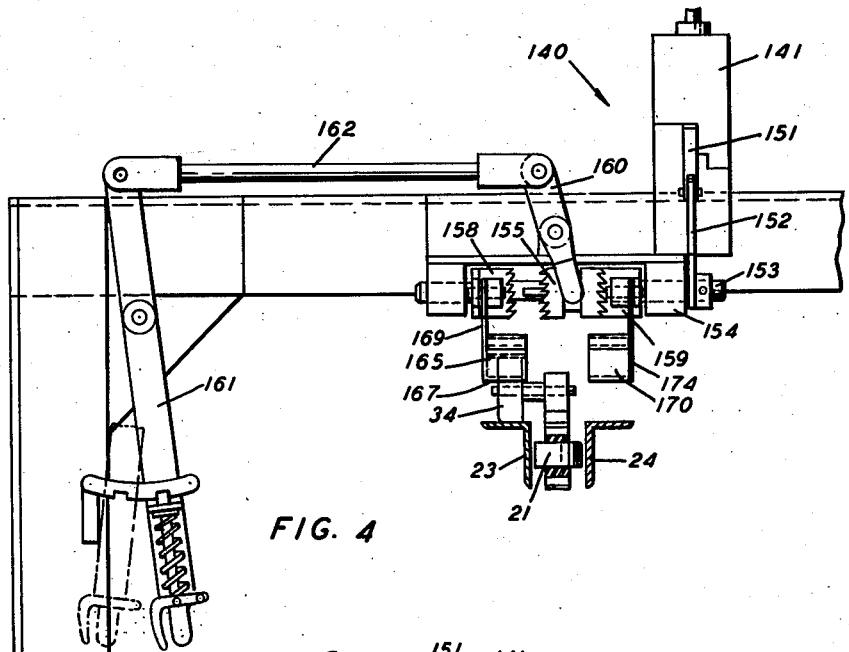
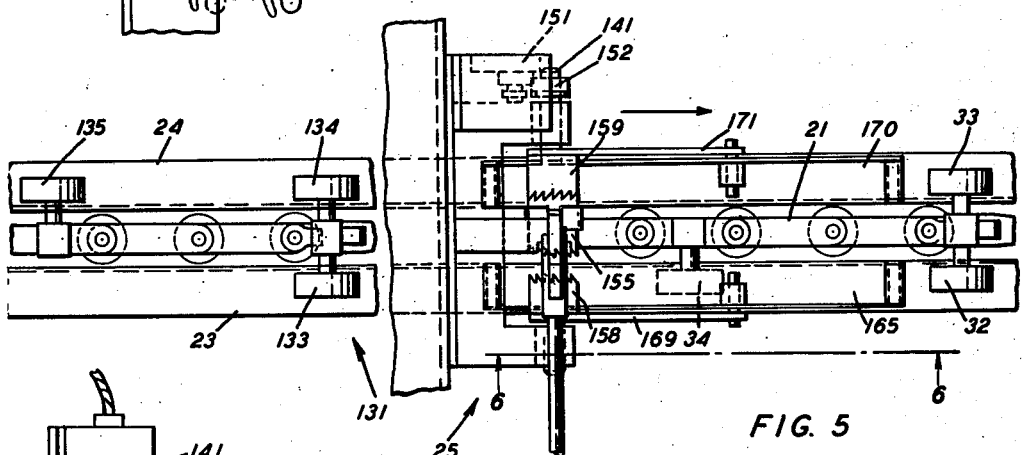
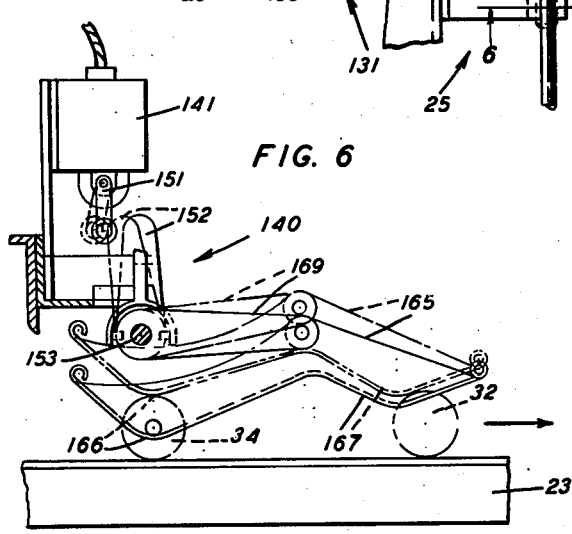

Oct. 19, 1948.    V. A. RAYBURN ET AL    2,451,975
CONVEYER
Filed Dec. 21, 1945    8 Sheets-Sheet 5
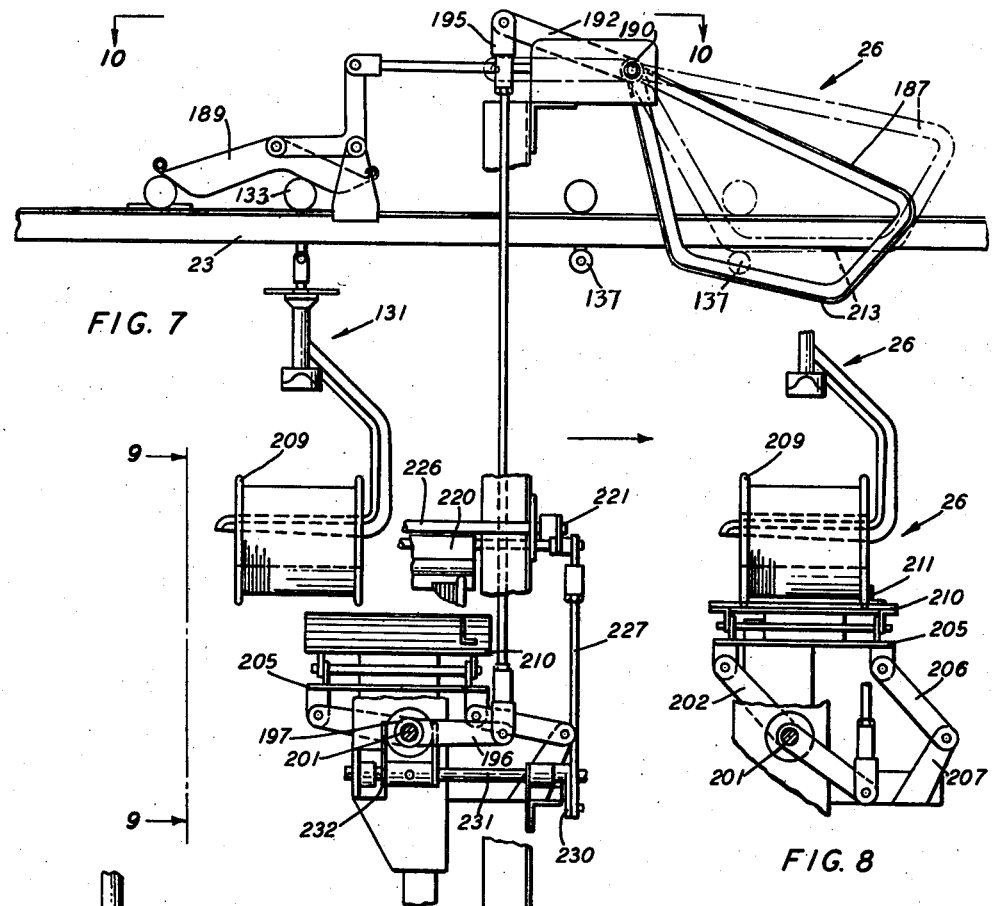
FIG. 7
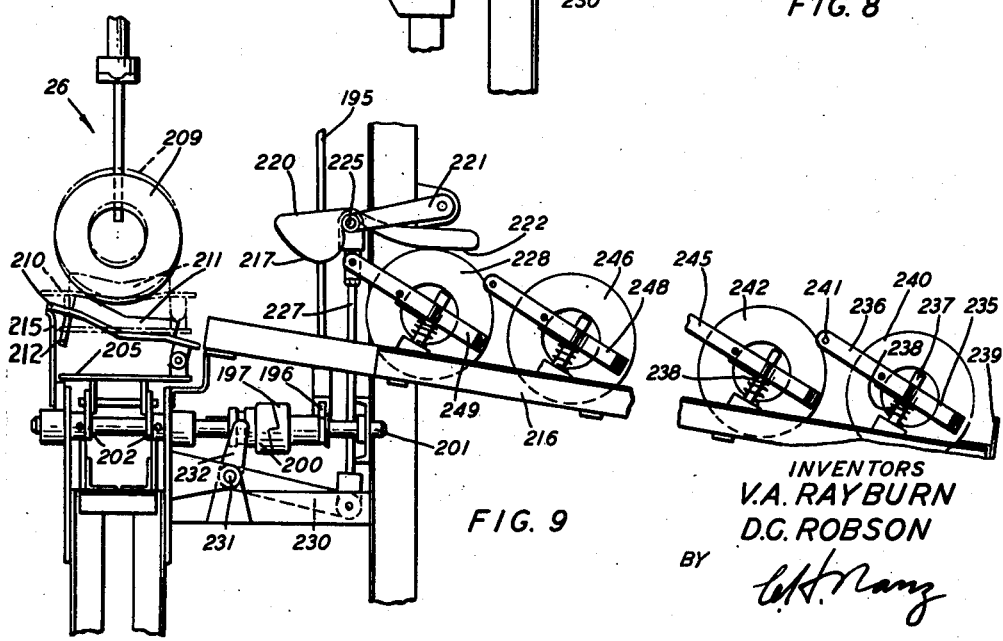
FIG. 8
FIG. 9
INVENTORS
V. A. RAYBURN
D. C. ROBSON
BY
ATTORNEY

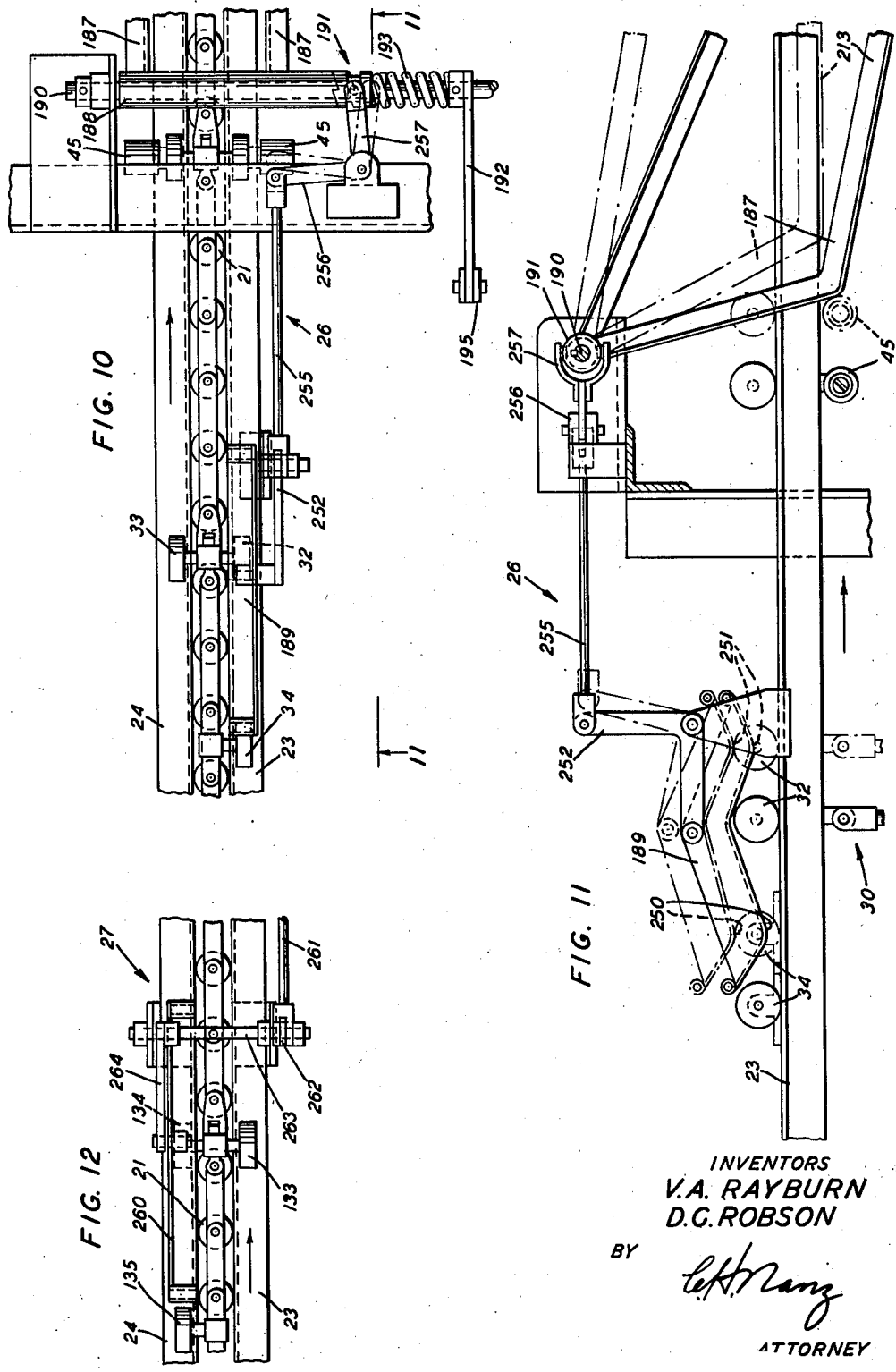

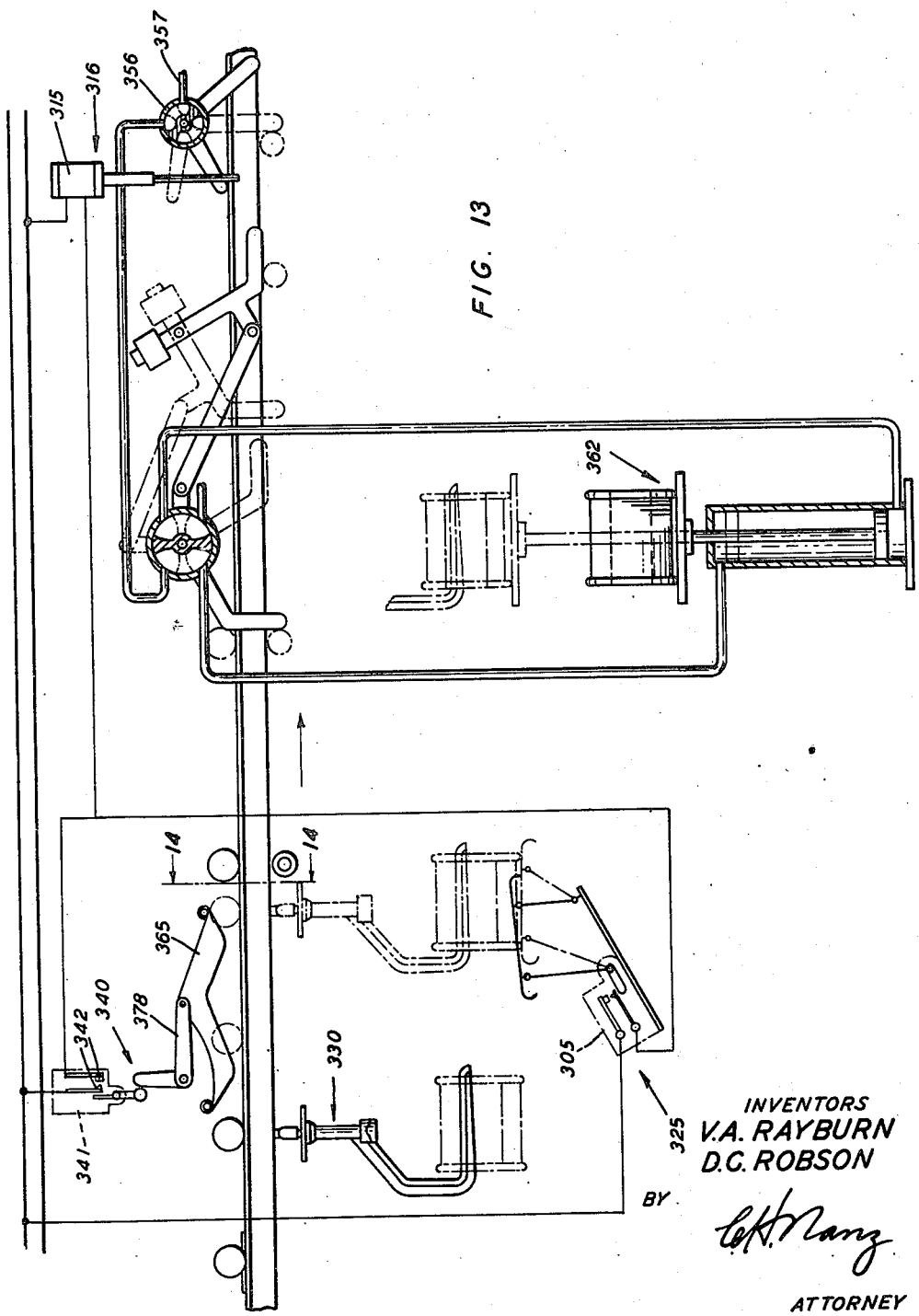

Oct. 19, 1948.  V. A. RAYBURN ET AL  2,451,975
CONVEYER
Filed Dec. 21, 1945  8 Sheets-Sheet 8
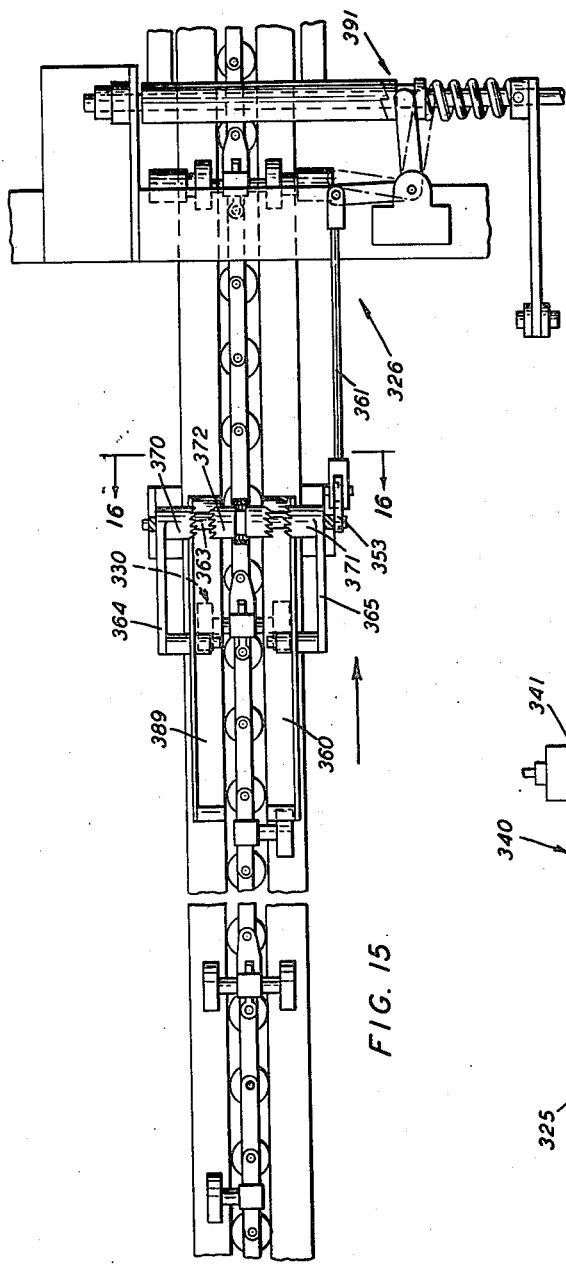
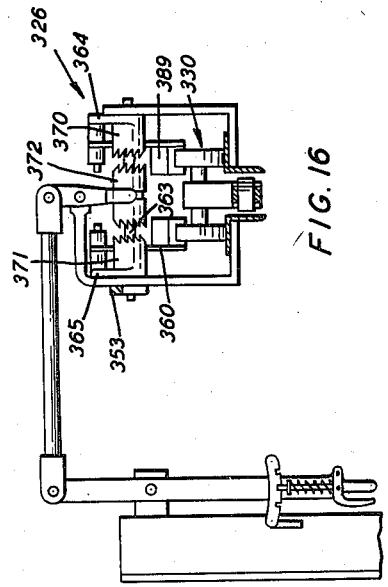
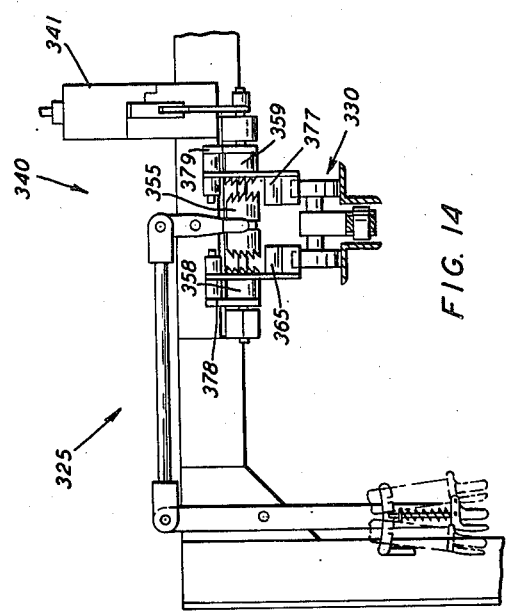
INVENTORS
V.A. RAYBURN
D.C. ROBSON
BY
ATTORNEY Patented Oct. 19, 1948

2,451,975

UNITED STATES PATENT OFFICE 2,451,975

CONVEYER

Vincent A. Rayburn and Duer C. Robson, Baltimore, Md., assignors to Western Electric Company, Incorporated, New York, N. Y., a corporation of New York Application December 21, 1945, Serial No. 636,405

14 Claims. (Cl. 214—60)

This invention relates to conveyers, and more particularly to conveyers for transporting reels.

In the operation of machines for making articles from strands, large numbers of reels, containers or packages including reels, or the like, of the strands must be transported to the machines. For the greatest ease in the operation of such machines, reserve supplies of the containers of the strands must be positioned at easily accessible spots relative to the machines. However, heavy containers are difficult to move and require much manual effort to move them to locations convenient to the machines. Also, some of the machines of a group may use one type of strand while others of the same group use another type of strand. Thus, packages of one type of strand must be transported to some of the group of machines while packages of another type of strand must be transported to others.

An object of the invention is to provide new and improved conveyers.

Another object of the invention is to provide new and improved conveyers of a type which selectively load different articles upon different conveyer elements and selectively unload the articles from the different conveyer elements.

A conveyer forming one specific embodiment of the invention includes a hook for holding a reel and a second hook for holding a second reel. A conveyer chain traveling over a guide track extending along a predetermined path carries the hooks over a hoist positioned below the path. Fluid-pressure means controlled by a valve serves as the motive means for the hoist. A tripping means located on one side of the track is carried by the chain in association with the first hook, and a second tripping means located on the other side of the track is carried by the chain in association with the second hook. Trippable means is positioned in the path of the first tripping means and a second trippable means is positioned in the path of the second tripping means. Two driver clutch members of a three-member clutch are associated with the trippable means, one of the driver clutch members being connected to one of the trippable means and the other driver clutch member being connected to the other trippable means. A manually controllable driven clutch member of the three-member clutch may be selectively engaged with either one of the driver clutch members and serves to open the valve when actuated by either of the driver clutch members so as to permit the operation of the hoist. Thus, a reel having one type of wire thereon may be automatically loaded on only one of the hooks, and a reel having a second type of wire thereon may be automatically loaded only on the other hook by normally controlled selective settings of the driven clutch member. An unloader for unloading reels from the first hook has driving means operable by trip rolls associated with the first hook, and a second unloader has a second driving means operable by trip rolls associated with the second hook. The trip rolls of either hook will operate either of the driving means. However, a trippable means in the path of the second tripping means throws out a clutch in the first driving means when it is actuated by the second tripping rolls so that the first unloader does not unload reels from the second hook. Conversely, a trippable means in the path of the first tripping means throws out a clutch in the second driving means when the second driving means is actuated by the first trip rolls so that the second unloader does not unload reels from the first hook. Thus, reels having one type of wire thereon may be unloaded from the first hook by only the first unloader, and reels having a second type of wire thereon may be unloaded from the second hook by only the second unloader.

A complete understanding of the invention may be obtained from the following detailed description of a conveyer forming a specific embodiment thereof, when read in conjunction with the appended drawings, in which Fig. 1 is a top plan view of a conveyer embodying the invention;

Fig. 4 is an enlarged, fragmentary, vertical section taken along line 4—4 of Fig. 2;

Fig. 5 is an enlarged, fragmentary, horizontal section taken along line 5—5 of Fig. 2;

Fig. 6 is an enlarged, fragmentary, vertical section taken along line 6—6 of Fig. 5;

Fig. 7 is an enlarged, fragmentary, vertical section taken along line 7—7 of Fig. 1;

Fig. 8 is an enlarged, fragmentary, vertical section similar to Fig. 7;

Fig. 9 is an enlarged, fragmentary, vertical section taken along line 9—9 of Fig. 7;

Fig. 10 is an enlarged, fragmentary, horizontal section taken along line 10—10 of Fig. 7;

Fig. 11 is an enlarged, fragmentary, vertical section taken along line 11—11 of Fig. 10;

Fig. 12 is an enlarged, fragmentary, top plan view of a portion of the conveyer;

Fig. 13 is an enlarged, schematic view of a portion of a conveyer system forming an alternative embodiment of the invention;

Fig. 14 is a vertical section taken along line 14—14 of Fig. 13;

Fig. 15 is an enlarged top plan view of a portion of the conveyer system shown in Fig. 13, and Fig. 16 is a vertical section taken along line 16—16 of Fig. 15.

Figure 1:
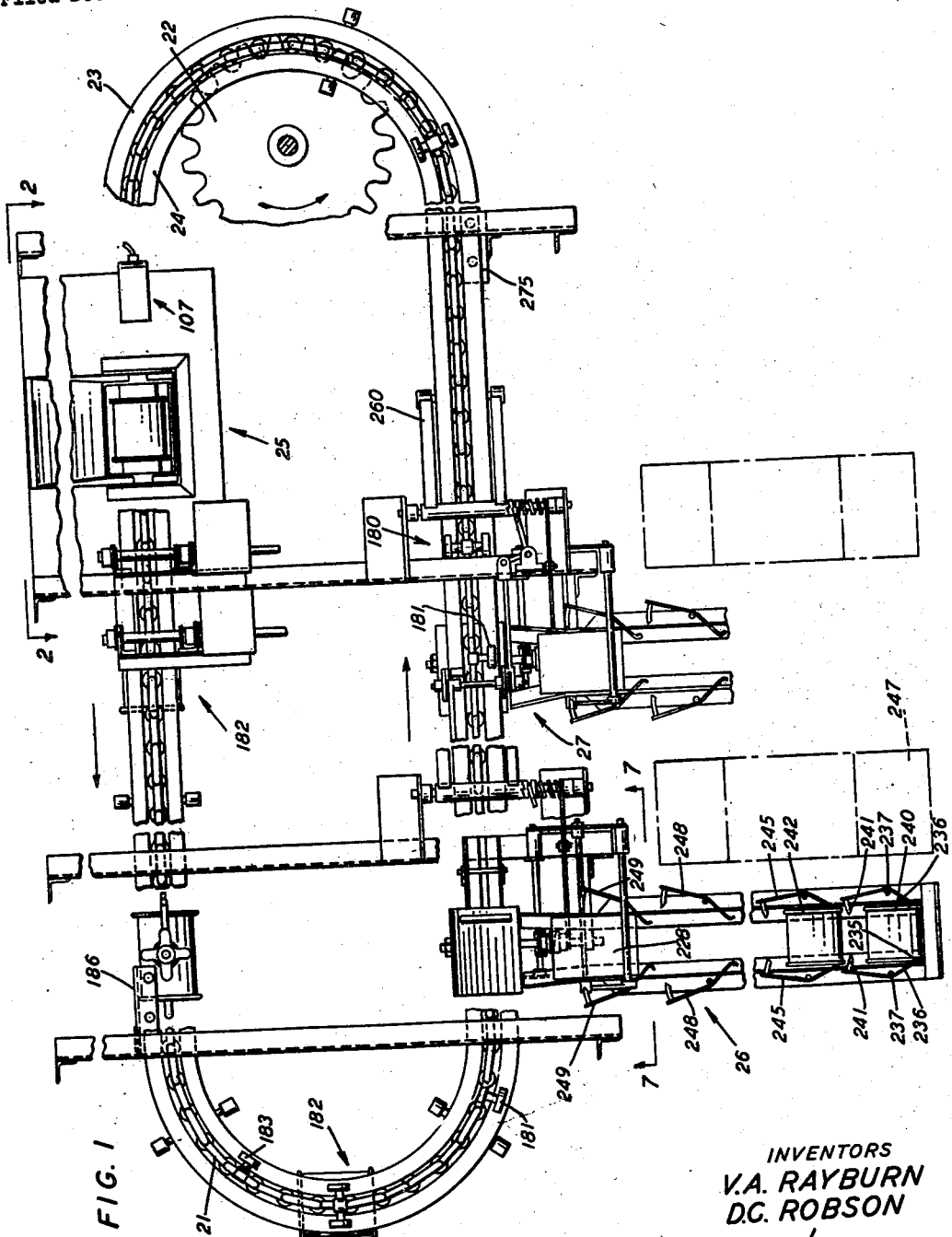

Referring now in detail to the drawings there is shown therein an overhead conveyer system, which includes a loader 25 (Fig. 1) and tracks 23 and 24 serving to guide an endless roller chain 21. The chain is advanced between the tracks by a sprocket 22 past the loader 25 and a plurality of unloaders illustrated by unloaders 26 and 27 which serve machines positioned adjacent thereto. A hook assembly 30 (Fig. 2) including a hook 31 is supported by support rolls 32 and 33 (Fig. 5) thereof. A selector roll 34 is positioned a predetermined distance to the left of the roll 32, as viewed in Fig. 2, and is carried by the chain 21 on only the track 23. A pair of trip rolls, of which a trip roll 45 is shown, is carried by the chain at a point a predetermined distance in advance of the hook assembly 30 and precedes the hook assembly 30 as the chain carries the hook assembly 30 beneath the tracks 23 and 24.

Figure 2:
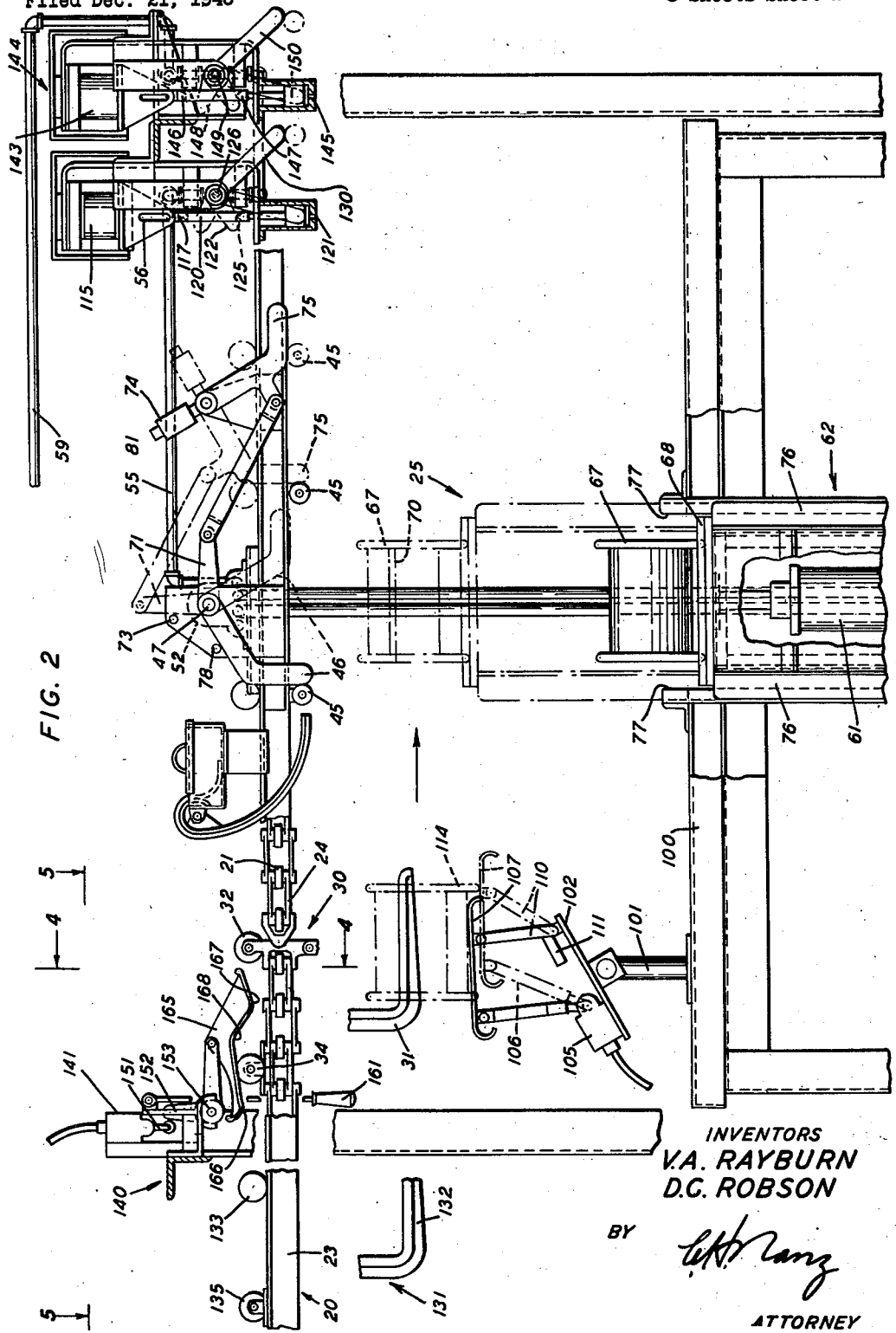
Fig. 2 is an enlarged, fragmentary, vertical section taken along line 2—2 of Fig. 1.
Figure 3:
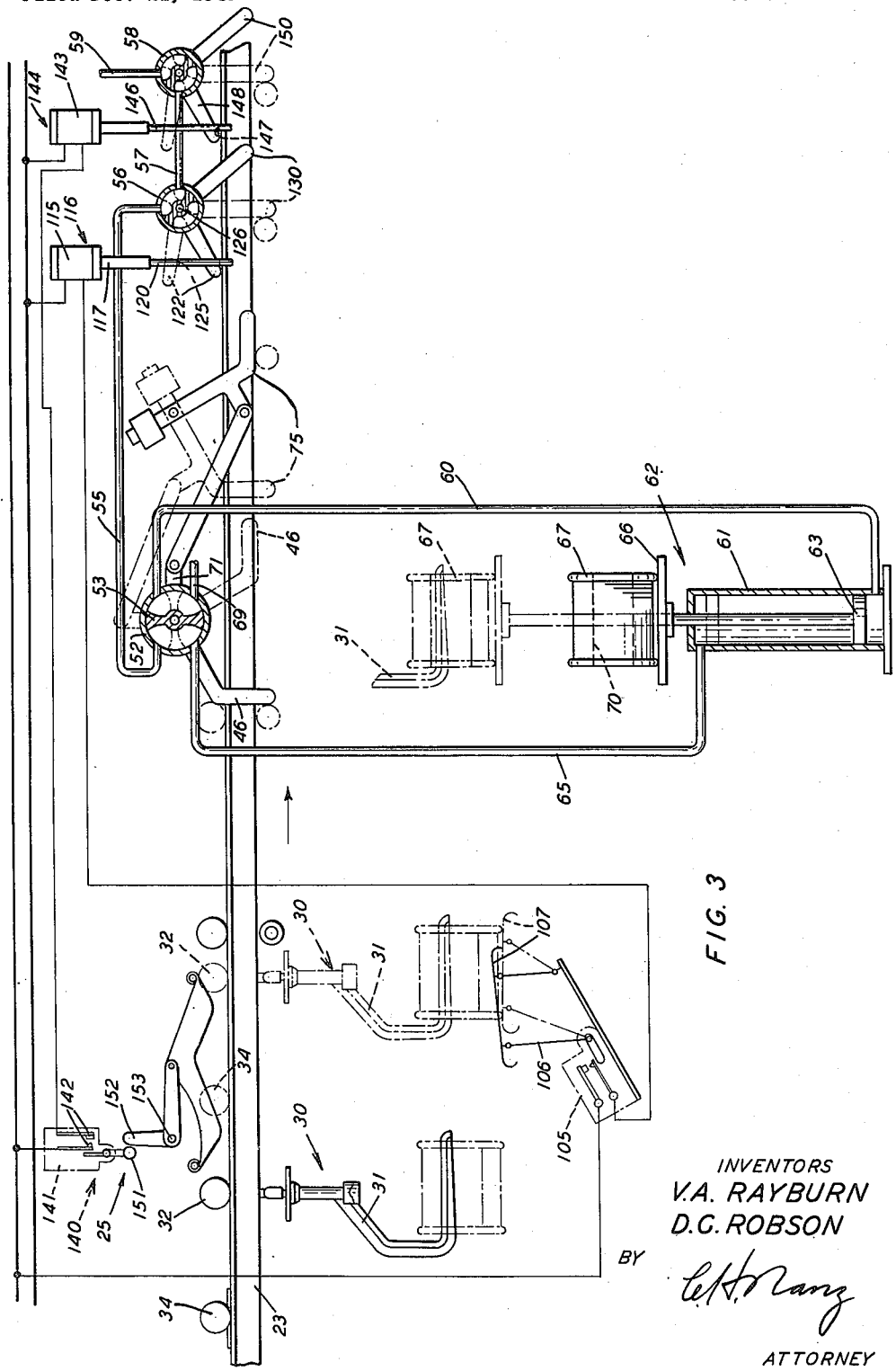
Fig. 3 is an enlarged, schematic view of the portion of the conveyer shown in Fig. 2.

When the hook assembly 30 is advanced toward the loader 25, the trip rolls 45—45 engage L-shaped cams of which an L-shaped cam 46 (Figs. 2 and 3) is shown, rigidly connected to a shaft 47 and move the L-shaped cams from their full-line positions, as shown in Fig. 2, to their broken-line positions. When the cams 46—46 are moved from their full-line positions to their broken-line positions, the shaft 47 is rotated and actuates a four-way valve 52 (Fig. 3) to move a vane 53 thereof from its full-line position to its broken-line position, as shown in Fig. 3. A pipe 55 serves to connect the four-way valve 52 to a normally open valve 56, which is connected to a pipe 57 leading to a normally closed valve 58. The valve 58 is connected to a supply of compressed air (not shown) by a pipe 59.

Assuming that the valve 56 is open and that the valve 58 has been opened as described hereinbelow, when the four-way valve 52 is actuated, as described hereinabove, it serves to connect the pipe 55 to a pipe 60 (Fig. 3), whereby the lower portion of a cylinder 61 of a hoist 62 is supplied with compressed air, and a piston 63 then is moved upwardly, as viewed in Fig. 3. A pipe 65 connected to the upper portion of the cylinder 61 and to the valve 52, which connects the pipe 65 to an exhaust pipe 69 at this time, serves to exhaust the air from the upper portion of the cylinder. When the piston is moved upwardly, a reel 67 positioned on a carriage 66 between stops, illustrated by a stop 68 (Fig. 2) is lifted into the path of the hook 31. The hook assembly 30 continues to advance to the right, as viewed in Fig. 2, and the hook 31 enters a core hole 70 formed in the reel 67.

When the L-shaped cams 46—46 are moved from their full-line positions to their broken-line positions, they move projections, of which a projection 71 is shown, of the cams 46—46 against stop pins, of which a stop pin 73 is shown. When the projections are so moved, they move through links, of which a link 72 is shown, L-shaped cams, of which an L-shaped cam 75 is shown, into the paths of trip rolls 45—45, as illustrated by the broken-line positions of the cams 75—75. An overcenter counterweight 74 connected with the cams 75—75 prevents accidental movement of the linkage system just described when this linkage system is in either its full-line position or its broken-line position. After the cams 75—75 are moved to their broken-line positions and the hook 31 has entered the core hole 70 in the reel 67, the trip rolls 45—45 engage the cams 75—75 and move them from their broken-line positions to their full-line positions, and the links 72—72 cause the shaft 47 to be rotated in a counterclockwise direction, as viewed in Fig. 3. The cams 46—46 are moved against stop pins, of which a stop pin 78 (Fig. 2) is shown, in which positions the ends of the cams 46—46 project below the tracks 23 and 24 back into the paths of the trip rolls 45—45. When the shaft 47 is so rotated, the valve 52 is reversed, whereby compressed air is supplied by the pipe 65 to the upper portion of the cylinder 61 and is exhausted by the pipes 60 and 69 from the lower portion of the cylinder 61. The piston 63 and the carriage 66 of the hoist 62 then are lowered and the reel 67 having the hook 31 projecting through the core hole 70 thereof is retained on the hook 31. As the piston 63 and the carriage 66 are lowered, guides 76—76 (Fig. 2) secured to the carriage slide downwardly on guide-ways 77—77 and guide the carriage to its lowermost position.

A post 101 projecting from a platform 100 of the loader 25 serves to support a mounting plate 102, which supports a normally open limit switch 105 thereon. An arm 106 serves to close the limit switch 105 when it is moved from its full-line position to its broken-line position shown in Fig. 2. A shoe 107 is pivotally connected to the arm 106 and an arm 110, which is pivotally mounted on the plate 102 and supports a counterweight 111. The counterweight 111 normally maintains the shoe 107 in its full-line position, as shown in Fig. 2, at which time the contacts of the limit switch 105 are open.

When the hook assembly 30 carrying a reel 114 approaches the hoist 62, before the trip rolls 45—45 engage the L-shaped cams 46—46, the reel 114 engages the shoe 107 and moves it from its full-line position to its broken-line position, whereby the contacts of the limit switch 105 are closed. The contacts of the limit switch are in series with a winding 115 of a solenoid 116, and, when they are closed, the winding of the solenoid 116 is energized, whereby an armature 117 of the solenoid is raised. A piston rod 120 connected to the armature is raised with the armature against the action of a dashpot 121.

An arm 122 projects into an elongated slot 125 formed in the piston rod 120 and is connected to a shaft 126. The shaft 126 is rotated in a clockwise direction, as viewed in Fig. 2, when the winding 115 of the solenoid 116 is actuated, by the arm 122, which is rotated in a clockwise direction by the piston rod 120. When the shaft 126 is so rotated, it closes the valve 56 (Fig. 3), which shuts off the supply of compressed air to the valve 52 and the hoist 62. Thus, when the trip rolls 45—45 subsequently turn the cams 46—46 to actuate the valve 52, the hoist 62 cannot be raised. After the valve 56 has thus been closed, the hook assembly 30 carrying the reel 114 continues to advance to the right, as viewed in Fig. 2, until the reel 114 clears the shoe 107. The counterweight 111 then causes the levers 106 and 110 and the shoe 107 to return to their full-line positions, whereby the contacts of the limit switch 105 are opened and the circuit to the winding 115 of the solenoid 116 is broken, whereby the armature 117 and the rod 120 then drop by gravity. However, the arm 122 and cams 130—130 remain in their broken-line positions, as viewed in Fig. 2, due to the tightness of the valve 56 and the fact that the elongated slot 125 formed in the piston rod 120 provides clearance for the arm 122 during the downward movement of the piston rod 122 so that the valve 56 remains closed. The trip rolls 45—45 then wipe the cams 46—46. This actuates the four-way valve 52 but the hoist 62 is not actuated because the valve 56 is closed. The trip rolls 45—45 then wipe the cams 75—75 and return the cams 75—75 to their full-line positions which recloses the valve 52 with respect to the hoist 62. The rolls 45—45 then wipe the cams 130—130 to return them from their broken-line positions, as shown in Fig. 3, to their full-line positions, whereby the valve 56 (Fig. 3) is opened. However, by the time the valve 56 is opened in this manner, the four-way valve 52 has been closed so that the hoist 62 is not raised.

A second hook assembly 131 (Figs. 1 and 2) identical with the hook assembly 30 includes a hook 132 and is carried by the roller chain 21. Support rolls 133 and 134 (Fig. 5) roll along the tracks 23 and 24, respectively, and support the hook assembly 131 and the roller chain. A selector roll 135 is positioned behind the support roll 134 the same distance as that between the support roll 32 and the selector roll 34. However, the selector roll 135 rolls along the track 24 whereas the selector roll 34 rolls along the track 23.

Trip rolls 137—137 (Fig. 7) identical with the trip rolls 45—45 are positioned ahead of the hook assembly 131 the same distance that the trip rolls 45—45 precede the hook assembly 30. The trip rolls 137—137 are designed to actuate the cams 46—46, 75—75 and 130—130 in the same manner as the trip rolls 45—45. However, before the hoist 62 is raised when the cams 46—46 are tripped by either the trip rolls 45—45 or 137—137 and the valve 52 is actuated, the valve 58 must be open so that air under pressure may be supplied to the valve 52 and the hoist.

A selective control mechanism 140 (Figs. 2, 3, 4, 5 and 6) for controlling the valve 58 includes a limit switch 141 whose normally open contacts 142—142 are in series with a winding 143 of a solenoid 144 identical with the solenoid 116. A dashpot 145 including a piston rod 146 having an elongated slot 147, an arm 148, a shaft 149, and cams 150—150 are identical with the dashpot 121, the piston rod 120 having the elongated slot 125, the arm 122, the shaft 126 and the cams 130—130, respectively, and actuate the valve 58 in the same manner that the last-mentioned elements actuate the valve 56 except that energization of the winding 143 opens the valve 58 while energization of the winding 115 closes the valve 56. An arm 151 (Fig. 2) of the limit switch 141 closes the contacts 142—142 of the limit switch when moved in a clockwise direction, as viewed in Fig. 3, by a cam 152 fastened rigidly to a shaft 153. The shaft 153 is mounted in bearings 154—154 (Fig. 4), and a double-faced driven clutch member 155 is splined to the shaft 153. The clutch member 155 may be moved by a yoke 160, which is connected to a hand lever 161 by a link 162, into engagement with either a driver clutch member 158 or a driver clutch member 159, which are freely rotatable on the shaft 153.

A rider 165 having lobes 166 and 167 (Fig. 6) and a recess 168 is pivotally mounted on an arm 169, which is rigidly secured to the driver clutch member 158 (Fig. 5), at a point directly over the recess 168 (Fig. 6). A rider 170, which is identical with the rider 165 and has lobes, of which a lobe 171 is shown, and a recess (not shown) which correspond to the lobes 167 and 166 and the recess 168 of the rider 165, but is mounted over the track 24, is pivotally mounted at a point over the recess by an arm 174 secured to the driver clutch member 159. Normally, the lobes 166 and 167 of the rider 165 are in the path of the support rolls 32 and 133 and the selector roll 34 associated with the support roll 32.

When the support roll 133 is advanced past the rider 165, it merely rocks the rider 165 without pivoting the arm 169 or the driver clutch member 158 and does not open the valve 58. However, the support roll 32 and the selector roll 34 are spaced apart the same distance as that between the lobes 166 and 167 of the rider 165. Hence, when the rolls 32 and 34 engage simultaneously the lobes 166 and 167 and raise the rider 165, the arm 169 and the driver clutch member 158 are rotated. Thus, if the driven clutch member 155 has been moved into engagement with the driver clutch member 158, the cam 152 is rotated to close the contacts 142—142 of the limit switch 141, whereby the valve 58 is opened and the hoist 62 may be raised when the valve 52 is actuated as the trip rolls 45—45 trip the cams 46—46, as described hereinabove. Thus, a reel on the hoist 62 will be loaded on the hook assembly 30 when the operator of the loader 25 sets the control mechanism 140 so that the driven clutch member 155 is in engagement with the driver clutch member 158. However, as the hook assembly 30 leaves the loader 25, the trip rolls 45—45 close the valve 58 by striking the cams 150—150 so that the hoist 62 may not be supplied with air under pressure until the valve 58 is reopened. But while the driven clutch member 155 is left in engagement with the driver clutch member 158, the valve 58 may be opened only when both ends of the rider 165 are raised simultaneously. Thus, as the support roll 133 only rocks the rider 165 when the hook assembly 131 is advanced past the loader, the valve 58 is not opened and the hoist does not load a reel on the hook 132 of the hook assembly 131.

If the driven clutch member 155 is set in engagement with the driver clutch member 159 by the operator of the loader 25, the hoist 62 will be raised when the hook assembly 131 is advanced therepast because the support roll 134 and the selector roll 135 will strike simultaneously lobes, illustrated by the lobe 171, of the rider 170, which is positioned over the track 24 normally in the paths of these rolls and the support roll 34. When the rolls 134 and 135 strike the lobes of the rider 170, the rider 170 is raised and the arm 174 and the driver clutch member 159 are pivoted, whereby the limit switch 141 is closed and opens the valve 58. Hence, air is introduced to the valve 52 and the hoist can be raised when the hook assembly 131 is advanced to the hoist 62. However, the hoist 62 may not be raised to load a reel on the hook 31 of the hook assembly 30 when the control mechanism 140 is set so as to permit loading of reels on the hook 132 of the hook assembly 131 because only the support roll 33 of the hook assembly 30 engages the rider 170 and only rocks it. The driver clutch member 158 is not in engagement with the driven clutch member 155 so that the raising of the rider 165 by the rolls 32 and 34 does not close the limit switch 141.

Thus, the control mechanism 140 of the loader 25 may be set in two different positions to load only the hook assembly 30 or load only the hook assembly 131. Other hook assemblies 180—180 are carried by the chain and each is provided with one of selector rolls 181—181 spaced with respect thereto like the selector roll 34 is spaced with respect to the hook assembly 30. Hook assemblies 182—182 are provided with selector rolls 183—183 corresponding to the selector roll 135 of the hook assembly 131. Each of the hook assemblies 30, 131, 180—180 and 182—182 are spaced from the others a sufficient distance that it operates the loader completely before the next hook assembly starts to operate the loader.

The hook assemblies 30, 131, 180—180 and 182—182 are advanced seriatim from the loader 25 past a turner 186 (Fig. 1), which turns the hooks thereof so that they point in a direction opposite to that in which they are advanced. The turner 186 and the construction of the hook assemblies enabling such orienting of the hooks are described and claimed in copending application Serial No. 636,401, filed December 21, 1945. The hook assemblies then are advanced past the unloaders 26 and 27.

As the hook assembly 131 is advanced toward the unloader 26 (Figs. 7, 8 and 9), the support roll 133 only rocks a rider 189 (Figs. 7, 10 and 11), positioned over the track 23 and the trip rolls 45—45 engage cams 187—187 (Fig. 11) and move these cams from their full-line positions, as shown in Fig. 7, to their broken-line positions. The cams 187—187 are rigidly fastened to a driver clutch member 188 which is freely rotatable on a shaft 190, and serve to rotate the clutch member 188 in counterclockwise direction, as viewed in Fig. 7, when they are moved from their full-line positions to their broken-line positions. A driven clutch member 191 splined to the shaft 190 normally is held in engagement with the driver clutch member 188 by a compression spring 193 so that an arm 192 rigidly mounted on the shaft 190 is moved from its full-line position to its broken-line position when the cams 187—187 are pivoted by the trip rolls 137—137.

When the arm 192 is rotated from its full-line position to its broken-line position, it moves a link 195 connected thereto downwardly, as viewed in Fig. 7, whereby an arm 196 is rotated in a clockwise direction from its full-line position to its broken-line position. The arm 196 is connected rigidly to a driver clutch member 197 rotatably mounted on a shaft 201. The driver clutch member 197 normally engages a driven clutch member 200 (Fig. 8) splined to the shaft 201, and normally rotates the driven clutch member 200 and the shaft 201 in a clockwise direction, as viewed in Fig. 7, when it is rotated by the arm 196. The shaft 201 rotates arms 202—202 (Fig. 9), and when the arms 202—202 are so rotated, they raise a table 205, which is pivotally connected thereto and to arms, of which an arm 206 (Fig. 8) is shown, pivotally connected to a bracket 207. The arms 206—206 are rotated from their positions shown in Fig. 7 to their positions shown in Fig. 8 when the arms 202—202 are rotated by the shaft 201 from their positions shown in Fig. 7 to their positions shown in Fig. 8, whereby the table 205 is raised. As the table 205 is raised, it raises a concave receiving platform 210 from its full-line position shown in Fig. 9 to its broken-line position. The right edge of the platform 210 is pivotally connected to the table 205 and is tilted by a stop 215, downwardly toward the right when the table 205 is in its down position. However, as the table 205 is raised from its full-line position to its broken-line position, a spacer 212 depending from the platform 210 engages the table 205, whereby the platform 210 is raised to a horizontal position.

When the table 205 is moved from its full-line position to its broken-line position, the platform 210 engages and lifts a reel 209 carried by the hook 132 from the hook 132. A stop 211 positioned on the platform 210 retards the advancement of reel, and as the hook assembly 131 continues to move to the right, as viewed in Fig. 8, the reel 209 is slid from the hook 132 and rests on the platform 210.

After the hook 132 has been withdrawn from the reel 209 on the receiving platform 210, the trip rolls 137—137 are advanced out of engagement with elongated dwell portions 213—213 of the cams 187—187, and the weight of the reel forces the platform 210 and the table 205 to their full-line positions, shown in Fig. 8, whereby the cams 187—187 are returned from their broken-line positions to their full-line positions.

As the table 205 and the platform 190 are lowered from their broken-line positions shown in Fig. 9 to their full-line positions, the left side of the platform 210 engages the stop 215 and the platform 210 tilts downwardly to the right. The reel 209 then rolls from the receiving platform 210 onto a ramp 216 and engages a lobe 217 of a rider 220 and raises the lobe 217. The rider 220 is secured by a rod 225 pivotally to arms 221—221, which are mounted on a rod 226. A lobe 222 of the rider 220 is shown resting on a reel 228 supported by the ramp 216, which is filled by the arrival of the reel 209 thereon. Thus, when the newly arrived reel 209 engages the lobe 217 of the rider 220, the rider is raised, whereby the rod 225 is raised and raises a link 227 connected thereto. When the link 227 is raised, it pivots an arm 230 in a counterclockwise direction, as viewed in Fig. 8, whereby a shaft 231 and a yoke 232 connected to the driven clutch member 200 are rotated in a counterclockwise direction. This moves the driven clutch member 200 out of engagement with the driver clutch member 197. Consequently, when the ramp 216 is filled and a hook assembly following the hook assembly 131 approaches the unloader 26, the receiving platform 210 will not be raised when the cams 187—187 are actuated by trip rolls associated with that hook assembly, and reels carried thereby will not be drawn therefrom. Hence, overloading of the ramp 216 is prevented.

If the portion of the ramp 216 occupied by the reel 228 has been vacant when the newly arrived reel 209 was discharged onto the ramp 216, the rider 220 would merely rock on the rod 205 and would not raise the rod 205 when engaged by the reel 209, which would roll down the ramp 216. Thus, the driven clutch member 200 remains in engagement with the driver clutch member 197 until the ramp 216 is filled.

A pair of L-shaped levers 236—236 (Figs. 1 and 9) are rotatably mounted on pins 237—237 projecting from the ramp 216 and lower ends 235—235 of the levers 236—236 are urged toward each other by torsion springs 238—238 mounted on the posts 237—237. A reel 240 engaging a stop 239 (Fig. 9) positioned at the bottom of the ramp 216 engages the lower ends 235—235 of the levers 236—236 and thrusts the lower ends away from each other, whereby curved pins 241—241 mounted on the upper ends of the levers 236—236 are maintained in the path of a reel 242 and keep the reel 242 out of contact with the reel 240.

A pair of levers 245—245 (Fig. 1), which are identical with the levers 236—236, are held in positions in which they stop another reel (not shown) in a position just above the reel 242, and a reel 246 and the reel 228 are similarly held by a pair of levers (not shown) and levers 248—248, respectively. Levers 249—249 hold the reel 209 out of contact with the reel 228. Thus, all of the reels positioned on the ramp 216 are held from contact with each other. When an operator of a machine 247 Fig. (1), which the unloader 26 supplies reels to, lifts the reel 240 (Fig. 8) from the ramp 216, the torsion springs 238—238 mounted on the pins 237—237 (Fig. 1) and the force exerted by the reel 242 on the curved pins 241—241 moves the pins 241—241 out of the path of the reel 252 and the reel 242 then rolls down the ramp 216 to the position in which the reel 240 is shown. The other reels then move down the ramp in a similar fashion but are kept out of contact with each other by the levers 236—236 and the pins 241—241 and the levers and pins identical therewith. When the newly unloaded reel 209 moves to the position in which the reel 228 is shown, the lobe 217 (Fig. 9) is freed and the driven clutch member 200 moves back into operative engagement with the driver clutch member 197. Thus, when the next loaded one of the hook assemblies 131 and 182—182 is advanced over the platform 210, the platform 210 is raised and unloads a reel therefrom.

When the hook assembly 30 (Fig. 2) is advanced past the loader 26 (Fig. 1) and before the trip rolls 45—45 strike the cams 187—187, the selector roll 34 and the support roll 32 simultaneously engage lobes 250 and 251 (Fig. 11) of the rider 189 and pivot a bell crank 252 in a clockwise direction, as viewed in Fig. 11. This pushes a link 255 to the right, which pivots a bell crank 256 in a clockwise direction, as viewed in Fig. 10. A yoke 257 of the bell crank 256 moves the driven clutch member 191 out of engagement with the driver clutch member 188 against the action of the spring 193. The trip rolls 45—45 then engage the cams 187—187 and move them from their full-line positions to their broken-line positions. However, the receiving platform 210 is not raised because the rolls 34 and 32 still engage the lobes 250 and 251 of the rider 189 and maintain the driven clutch member 191 out of engagement with the driver clutch member 188. Hence, reels carried by the hook assembly 30 will not be unloaded by the unloader 26. The same is true of the hook assemblies 180—180 whose selector rolls 181—181 are positioned on the track 23. The selector rolls 183—183 of the hook assemblies 182—182 are positioned on the track 24 so that the unloader 26 unloads reels from the hook assemblies 182—182 as well as the hook assembly 131.

The unloader 27 (Figs. 1 and 12) is identical with the unloader 26 except that a rider 260 thereof, which is identical with the rider 189, is positioned over the track 24 and in the path of the selector rolls 135 and 183—183 while the rider 189 (Fig. 1) is positioned over the track 23 and in the path of the selector rolls 34 and 181—181. Also, a link 261 of the unloader 27, which corresponds to the link 255 of the unloader 26, is connected to the rider 260 by an arm 262 rigidly fastened to a shaft 263. An arm 264 is rigidly fastened to the shaft 263 and pivotally mounts the rider 260.

When one of the hook assemblies 30 and 180—180 is advanced to the unloader 27, the selector roll associated therewith does not touch the rider 260, which is positioned over the track 24, since the selector roll associated with this hook assembly rolls along only the track 23. Hence, the support roll associated with this hook assembly and positioned on the track 24 only rocks the rider 260 without raising it, and the unloader 27 is operated by the trip rolls associated with this hook assembly. However, when one of the hook assemblies 131 and 182—182 is advanced to the loader 27, the selector roll and the support roll associated therewith, which roll along the track 24, raise the rider 260 whereby the unloader 27 is rendered inoperative until that hook assembly has been advanced therepast.

Other unloaders (not shown), some of which are identical with the unloader 26 and the rest of which are identical with the unloader 27, are positioned between the unloaders 26 and 27. As described hereinabove, when the ramp 216 is filled, the platform 210 cannot be raised by the trip rolls associated with hook assemblies advanced therepast as the trip rolls are moved into engagement with the cams 187—187, and the reels carried by the hook assemblies will not be discharged in the ramp 216. The hook assemblies 131 and 182—182, after filling the ramp 216, discharge reels onto the next partly empty one of the unloaders identical with the unloader 26 until a time when all of the ramps of the unloaders, like the unloader 26, and the unloader 26 are filled. If all these ramps are filled, reels carried therepast by the hook assemblies 131 and 182—182 are carried around the conveyer until a reel is taken from one of these ramps to render the unloader including that ramp operative. The ramps associated with the unloader 27 and the unloaders identical therewith are filled in a manner similar to that in which the unloader 26 and the unloaders similar thereto are filled but are filled by only the hook assemblies 30 and 180—180.

A turner 275 (Fig. 1) positioned in advance of the unloader 22 is identical with the turner 186 and turns 180° the hook assemblies 30, 131, 180—180 and 182—182 as the hook assemblies are advanced therepast so that the hooks of the hook assemblies point in the direction in which they are advanced as they approach the loader 25.

In the operation of the conveyer system described hereinabove, the hook assemblies illustrated by the hook assemblies 30, 131, 180—180 and 182—182 are advanced past the loader 25. The loader may be set by moving the hand lever 161 in a counterclockwise direction, as viewed in Fig. 4, so as to load reels having one type of wire thereon exclusively upon the hook assemblies 30 and 180—180. These hook assemblies then fill the ramps (Fig. 1) associated with the unloader 27 and the unloaders identical therewith but do not have their reels unloaded by the unloader 26 and the unloaders identical therewith.

After the ramps associated with the unloader 27 and those identical therewith are filled, or before these ramps are filled, if so desired, reels having a different type of wire are placed one at a time on the loader 25, after turning the hand lever 161 in a clockwise direction, as viewed in Fig. 4, to move the driven clutch member 155 out of engagement with the driver clutch member 159 and into engagement with the driver clutch member 158. The loader 25 then loads the reels bearing the second type of wire only on the hook assemblies 131 and 182—182, which deposit reels upon only the unloader 26 and those identical therewith. Thus, a different type wire may be supplied to the machines associated with the unloader 26 and those like it from the type wire supplied to the machines associated with the unloader 27 and those like this unloader. The only attention required by the operator of the loader is to set the control mechanism 140 to load reels bearing one type wire on the hook assemblies 30 and 180—180 and to reset the control mechanism to load reels bearing the second type wire on the hook assemblies 131 and 182—182.

The above-described overhead conveyor system effects automatic selective loading and unloading of reels while the only discretion required of the operator of the loader 25 is that of setting the control mechanism 140 in one position for loading reels carrying one type wire and in the other position for loading reels carrying the second type wire.

If it is wished to use the above-described overhead conveyer systems to transport articles, such as boxes, containers, packages or the like, fork-like hooks (not shown) similar to those disclosed in our copending application Serial No. 636,404, filed December 21, 1945, may be substituted for the hooks of the hook assemblies 30, 131, 180—180 and 182—182, and the carriage 66 of the loader 25 and the receiving platforms and the riders of the unloaders may be replaced by the corresponding elements disclosed in that application. Thus, the overhead conveyer system described hereinabove may be used to selectively load and unload many types of articles automatically.

An overhead conveyer system forming an alternative embodiment of the invention is disclosed in Figs. 13, 14, 15 and 16. This overhead conveyer system includes a loader 325 (Figs. 13 and 14), which is identical with the loader 25 except that contacts 342—342 (Fig. 13) of a limit switch 341 of a control mechanism 340 are connected in series with a winding 315 of a solenoid 316, which corresponds to the solenoid 116 (Fig. 3) of the first-described embodiment. The contacts 342—342 are in parallel with a switch 305, which corresponds to the switch 105 (Fig. 3) in the first-described embodiment so that whenever the switch 305 or the switch 341 is closed, the winding 315 of the solenoid 316 is energized whereby a valve 356 corresponding to the valve 56 is closed. Whenever the valve 356 is closed, a hoist 362 cannot be actuated. No solenoid corresponding to the solenoid 144 is included in the loader 325 and no valve corresponding to the valve 58 of the loader 25 is included in the loader 325. A pipe 357 of the loader 325 is connected directly to a supply of air under pressure (not shown).

The control mechanism 340 also includes riders 365 and 377 identical with the riders 165 and 170, respectively. The riders 365 and 377 are pivotally secured to arms 378 and 379, respectively, which are rigidly fastened to driver clutch members 358 and 359, respectively, of a three-member driving clutch. This three-member driving clutch includes a driven clutch member 355, which may be set in engagement with either the driver clutch member 358 or the driver clutch member 359, or in engagement with neither of the driver clutch members 358 and 359. When the driven clutch member 355 is set in a position out of engagement with both of the driver clutch members 358 and 359, the loader 325 serves to load reels on both hook assemblies, of which a hook assembly 330 is shown, and hook assemblies of which a hook assembly 331 is shown. If the driven clutch member 355 is set in engagement with the driver clutch member 358, each of the hook assemblies 330—330 will close the switch 341 and prevent the operation of the loader 325 while the hook assemblies 331—331 will be loaded by the loader 325. If the driven clutch member 355 is set in engagement with the driver clutch member 359, each of the hook assemblies 331—331 will close the switch 341 and will prevent the operation of the hoist 362 while the hoist 362 will load reels on the hook assemblies 330—330. Hence, depending upon the setting of the clutch member 355 with respect to the driver clutch members 358 and 359, the loader 325 will load reels selectively upon either the hook assemblies 330—330 or upon the hook assemblies 331—331 or non-selectively upon both the hook assemblies 330—330 and the hook assemblies 331—331 so that these hook assemblies may be loaded either selectively or non-selectively.

The last-described embodiment of the invention also includes a plurality of unloaders of which an unloader 326 (Figs. 15 and 16) is shown. Each of the unloaders 326—326 is identical with the unloaders 26 and 27 except that a three-member driving clutch and riders 360 and 389 are incorporated therein. This three-member driving clutch includes a driver clutch member 370, which is rotatably mounted on a shaft 363 and is rigidly secured to an arm 364 mounting the rider 389. A driver clutch member 371 mounted for free rotation on the shaft 363 is rigidly secured to an arm 365 supporting the rider 360. A driven clutch member 372 splined to the shaft 363 may be set in a position in engagement with either the driver clutch member 370 or the driver clutch member 371 or in a position in engagement with neither of the driver clutch members 370 and 371. An arm 353 fastened rigidly to the shaft 263 is connected to a link 361, which corresponds to the link 261 (Fig. 12).

If the driven clutch member 372 (Fig. 15) is set in engagement with the driver clutch member 370, the loader 326 will unload reels only from the hook assemblies 330—330 because each of the hook assemblies 331—331 will cause a clutch 391 corresponding to the clutch 191 to be disengaged as it is advanced past the loader 326. If the driven clutch member 372 is set in a position in engagement with the driver clutch member 371, only the hook assemblies 331—331 will be unloaded because each of the hook assemblies 330—330 will cause the clutch 391 to be disengaged as they are advanced past the unloader 326. If the driven clutch member 372 is set in a position in engagement with neither the driver clutch member 370 nor the driver clutch member 371, the unloader 326 will unload reels from the hook assemblies 330—330 and also will unload reels from the hook assemblies 331—331. Hence, each of the unloaders 326—326 may be individually set to unload the reels from only one group of hook assemblies from only the other group of hook assemblies or from all of the hook assemblies.

In the operation of the last-described overhead conveyor system, it may be used either as a selective conveyer system or a non-selective system. If it is used as a non-selective conveyer system, the driven clutch member 355 (Figs. 13 and 14) of the loader 325 is set in a position out of engagement with both the driver clutch members 358 and 359 so that the loader 326 loads reels having one type of wire upon all the hook assemblies 330—330 and 331—331. The driven clutch members, of which the driven clutch member 372 (Figs. 15 and 16) is shown, of the unloaders 326—326 are set in positions out of engagement with the driver clutch members, of which the driver clutch members 370 and 371 are shown, so that reels carried by any of the hook assemblies 330—330 and 331—331 may be unloaded by any of the unloaders 326—326.

If the last-described overhead conveyer system is used as a selective conveyer system, the driven clutch member 355 is set in engagement with the driver clutch member 358 part of the time so that the loader 325 loads reels carrying one type of wire only upon the hook assemblies 331—331. The driven clutch member 355 is set in engagement with the driver clutch member 359 when not in engagement with the driver clutch member 358 so that the loader 325 loads reels carrying a second type of wire upon only the hook assemblies 330—330.

Each of the driven clutch members 372—372 is set in engagement with one of the driving clutch members 370—370 and 371—371 so that each of the unloaders 326—326 is set to unload reels from only the hook assemblies 330—330 or 331—331, depending on which type of wire is needed at that particular unloader.

The last-described conveyer system may be modified in a manner similar to that suggested possible hereinabove for the first-described conveyer system to adapt the last-described conveyer system to carry articles such as packages, containers, or the like.

In the last-described overhead conveyer system, the loader 325 may be set to load reels selectively or non-selectively and each of the unloaders 326—326 may be set to unload reels selectively or non-selectively. Hence, the entire overhead conveyer system may be used with a great deal of flexibility as a selective conveyer system or as a non-selective conveyer system so that it may be adapted to changing manufacturing needs by simple adjustments.

What is claimed is:

1. An overhead conveyer system, which comprises an endless chain, means for advancing the chain along a predetermined path, a plurality of hooks, means for securing the hooks to the chain at points spaced therealong, a loader positioned adjacent to said path for selectively positioning reels of different types in the path of the hooks, means for placing the hooks in positions in which the hooks point in the direction of travel of the chain when the hooks are being advanced past the loader, whereby one of the hooks being advanced past the loader enters the drum of a reel positioned in the path of the hook by the loader and carries the reel from the loader, means for turning the hooks after the hooks leave the loader to positions in which the hooks are pointed in directions opposite to those in which the hooks are being advanced, and means positioned adjacent to said path for selectively lifting reels positioned on the hooks from the hooks.

2. An overhead conveyer system, which comprises means for advancing the chain along a predetermined path, a plurality of hooks, means for securing the hooks to the chain at points spaced therealong, a loader positioned adjacent to said path for selectively positioning reels of different types in the path of the hooks, means for placing the hooks in positions in which the hooks point in the direction of travel of the chain when the hooks are being advanced past the loader, whereby one of the hooks being advanced past the loader enters the drum of a reel positioned in the path of the hook by the loader and carries the reel from the loader, means for turning the hooks after they leave the loader to positions in which the hooks are pointed in directions opposite to those in which the hooks are being advanced, a plurality of means positioned adjacent to said path for lifting reels positioned on the hooks from the hooks, means associated with some of the hooks for preventing the operation of one of the lifting means, and means associated with others of the hooks for preventing the operation of another of the lifting means.

3. An overhead conveyer system, which comprises a hook for holding a reel, a second hook for holding a second reel, means for carrying the hooks seriatim along a predetermined path, a loader for loading individually the reels upon the hooks, means for driving the loader, means for preventing the operation of the loader-driving means, means for operating the preventing means, a tripper carried with the first-mentioned hook, means operable by the tripper for actuating the operating means, a second tripper carried with the second hook, a second actuating means operable by the second tripper for actuating the operating means, and means for selectively connecting the first-mentioned actuating means and the last-mentioned actuating means to the operating means.

4. An overhead conveyer system, which comprises a hook for holding a reel, a second hook for holding a second reel, means for carrying the hooks seriatim along a predetermined path, a loader for loading individually the reels upon the hooks, drive means for driving the loader, means for controlling the drive means, a tripper carried with the first-mentioned hook for operating the controlling means, a second controlling means for controlling the drive means, a second tripper carried with the second hook for operating the last-mentioned controlling means, and means for connecting selectively to the drive means the first-mentioned actuating means and the last-mentioned actuating means.

5. An overhead conveyer system, which comprises a hook for holding a reel, a second hook for holding a second reel, means for carrying the hooks seriatim along a predetermined path, a loader for loading individually the reels upon the hooks, fluid-pressure means including a supply line for driving the loader, and means for controlling the fluid-pressure means including a valve in the supply line, means for operating the valve, tripping means carried by the first hook on one side of the centerline of the path, second tripping means carried by the second hook on the other side of the centerline of the path, a rider positioned in the path of the first tripping means, a second rider positioned in the path of the second tripping means, and means for selectively connecting the first rider and the second rider operatively to the valve-operating means.

6. An overhead conveyer system, which comprises a hook for holding a reel, a second hook for holding a second reel, means for carrying the hooks seriatim along a predetermined path, a hoist positioned adjacent to said path for depositing the reels on the hooks, fluid pressure means for driving the hoist, a supply line leading from the fluid pressure means to a supply of motive fluid under pressure, a valve positioned in the supply line, means for actuating the valve, trip means carried with the first-mentioned hook, trippable means positioned in the path of the trip means, a second trip means carried with the second hook, a second trippable means positioned in the path of the second trip means, and means for connecting selectively the first trippable means and the second trippable means to the valve-actuating means.

7. An overhead conveyer system, which comprises a hook for holding a reel, a second hook for holding a second reel, means for carrying the hooks seriatim along a predetermined path, a hoist positioned adjacent to said path for depositing the reels on the hooks, fluid pressure means for driving the hoist, a supply line leading from the fluid pressure means to a supply of motive fluid under pressure, a valve positioned in the supply line, means for actuating the valve, trip means carried with the first-mentioned hook, trippable means positioned in the path of the trip means, a second trip means carried with the second hook, a second trippable means positioned in the path of the second trip means, a shaft for driving the valve-actuating means, a double-face driven clutch member splined to the shaft, a driver clutch member mounted rotatably on the shaft on one side of the driven clutch member and connected to the first trippable means, a second driver clutch member mounted rotatably on the shaft on the other side of the driven clutch member and connected to the second trippable means, and means for sliding the driven clutch member selectively into engagement with the first driver clutch member and the second driver clutch member.

8. An overhead conveyor system, which comprises means for holding an article, a second means for holding a second article, a roller chain carrying the article-holding means in spaced positions thereon, a pair of track members for guiding the chain therebetween, a pair of support rolls for supporting the first article-holding means, one of the support rolls bearing on one of the track members and the other support roll bearing on the other track member, a second pair of support rolls for supporting the second article-holding means, one of said second pair of support rolls bearing on one of the track members and the other support roll bearing on the other track member, means for advancing the chain along the track members, a loader for loading individually the articles upon the two article-holding means, fluid-pressure means having a supply line therein for driving the loader, a normally closed valve positioned in the supply line, a trip roll carried with the first article-holding means, a trip roll carried with the second article-holding means, a cam normally positioned in the path of the trip rolls for opening the valve to actuate the loader when one of the trip rolls strikes the cam, a second cam connected to the first cam and movable thereby into the path of the trip rolls for returning the first cam into the path of the trip rolls, whereby the valve is closed, a second valve positioned in the supply line in series with the first-mentioned valve, a third cam for controlling the second valve, a solenoid for moving the third cam to actuate the second valve when energized, a kicker connected to the third cam and movable into the path of the trip rolls when the third cam is moved by the solenoid for resetting the second valve when struck by one of the trip rolls, a normally open limit switch for energizing the solenoid, means including a driven clutch member for closing the limit switch, a rider having a pair of lobes, a driver clutch member, means connected to the driver clutch member for supporting the rider pivotally at a point between the lobes thereof and in a position over one of the track members with the lobes thereof in the path of the support rolls on that track member, a second rider having a pair of lobes, a second driver clutch member, a second supporting means connected to the second driver clutch member for supporting the second rider pivotally at a point between the lobes thereof and in a position over the other track member with the lobes of the second rider positioned in the path of the support rolls on that track member, means for moving the driven clutch member selectively into engagement with the first driver clutch member and the second driver clutch member, a selector roll associated with the first article-holding means and supported by the track member over which the first rider is positioned for striking one of the lobes of the first rider at the same time that the support roll associated with the first hook and positioned on the last-mentioned track member strikes the other lobe, whereby the first rider is raised to rotate the first driver clutch member, and a second selector roll associated with the second article-holding means and supported by the track member over which the second rider is positioned for striking one of the lobes of the second rider at the same time that the support roll associated with the second article-holding means and supported by that track member strikes the other lobe of the second rider, whereby the second rider is raised to rotate the second driver clutch member.

9. An overhead conveyer system, which comprises means for carrying an article, a second article-carrying means for carrying a second article, an unloader, means for driving the unloader including a clutch and a trippable means operable through the clutch to actuate the unloader, means for advancing the hooks seriatim past the unloader, trip means carried with the first article-carrying means for tripping the trippable means, a second trip means carried with the second article-carrying means for tripping the trippable means, a second trippable means for disengaging the clutch, and selector means carried by one of the article-carrying means for tripping the second trippable means to disengage the clutch.

10. An overhead conveyer system, which comprises a hook for carrying an article, a second hook for carrying a second article, an unloader, means for driving the unloader including a clutch and a trippable means operable through the clutch to actuate the unloader, means for advancing the hooks seriatim past the unloader, trip means carried with the first hook for tripping the trippable means, a second trip means carried with the second hook for tripping the trippable means, a second trippable means for disengaging the clutch, selector means carried with the first hook for tripping the second trippable means, a third trippable means for disengaging the clutch, a second selector means carried with the second hook for tripping the third trippable means, and means for selectively connecting the second trippable means and the third trippable means to the clutch.

11. An overhead conveyor system, which comprises an article-carrying means, a second article-carrying means, a track member, a second track member, a chain positioned between the track members for moving seriatim the two article-carrying means therealong, means for advancing the chain, an unloader positioned beneath the track members, a second unloader positioned beneath the track members, means including a clutch therein for driving the first unloader, a second unloader-driving means including a second clutch therein for driving the second unloader, a rider positioned over the first track member for rendering the first clutch inoperative, a second rider positioned over the second track member for rendering the second clutch inoperative, means carried on the first track member near the first article-carrying means for actuating the first rider, and a second rider-actuating means carried on the second track member near the second article-carrying means for actuating the second rider.

12. An overhead conveyer system, which comprises an article-carrying means, a second article-carrying means, a track member, a second track member, a chain positioned between the track member for moving seriatim the two article-carrying means therealong, means for advancing the chain, an unloader positioned beneath the guide track, a second unloader positioned beneath the guide track, means including a clutch therein for driving the unloader, means for disengaging the clutch, a pivotal rider having a pair of lobes positioned a predetermined distance apart and positioned over the first track member, a second pivotal rider having a pair of lobes positioned a predetermined distance apart and positioned over the second track member for rendering the second clutch inoperative, a pair of rolls spaced apart the same distance as that between the lobes of the first rider and carried on the first track member near the first article-carying means for actuating the first rider, a second pair of rolls spaced apart the same distance as that between the lobes of the second rider and carried on the second track member near the second article-carrying means for actuating the second rider, a driver clutch member operatively secured to the first rider, a second driver clutch member operatively secured to the second rider, a driven clutch member movable selectively into engagement with the first driver clutch member and the second driver clutch member and out of engagement with both of the driver clutch members for selectively connecting the driver clutch members operatively to the clutch-disengaging means.

13. An overhead conveyor system, which comprises an article-carrying means, a second article-carrying means, a track member, a second track member, a chain positioned between the track member for moving seriatim the two article-carrying means therealong, means for advancing the chain, an unloader positioned beneath the track members, a second unloader positioned beneath the track members, means including a clutch therein for driving the first unloader, a second unloader-driving means including a second clutch therein for driving the second unloader, a rider having a pair of lobes spaced a predetermined distance apart, means for supporting the rider pivotally at a point thereon between the lobes thereof and in a position over the first track member and for rendering the first clutch inoperative when raised by the rider, a second rider having a pair of lobes spaced a predetermined distance apart, means for supporting the second rider pivotally at a point thereon between the lobes thereof and in a position over the second track member and for rendering the second clutch inoperative when raised by the second rider, a pair of rolls spaced apart the same distance as the lobes on the first rider and carried on the first track member near the first article-carrying means for raising the first rider, and a second pair of rolls spaced apart the same distance as the lobes on the second rider and carried on the second track member near the second article-carrying means for raising the second rider.

14. An overhead conveyor system, which comprises means for carrying an article, a second means for carrying a second article, a track member, a second track member, a chain positioned betwen the track members, means for connecting the article-carrying means to the chain at points spaced therealong, a pair of support rolls supported on the track members for supporting the first article-carrying means, a second pair of support rolls supported on the track members for supporting the second article-carrying means, means for advancing the chain along the track members to advance the two article-carrying means along a predetermined path, a receiving platform positioned below the path of the article-carrying means, means for raising the receiving platform including a cam, a driver clutch member secured to the cam and a driven clutch member urged into engagement with the driver clutch member, a trip roll carried with the first article-carrying means for rotating the cam, a rider having a pair of lobes spaces a predetermined distance apart, means connected to the driven clutch member for supporting the rider pivotally at a point between the two lobes thereof and in a position over the first track member with the lobes of the rider positioned in the path of the support rolls on that track member, and a selector roll carried with the first article-carrying means along the first track member, said selector roll being spaced the same distance as that between the lobes of the rider from that support roll of the first pair of support rolls which is positioned on the first track member, whereby the selector roll and the last-mentioned support roll simultaneously engage the lobes of the rider and move the driven clutch member out of engagement with the driver clutch member by the rider-supporting means.

VINCENT A. RAYBURN.
DUER C. ROBSON.

REFERENCES CITED

The following references are of record in the file of this patent:

UNITED STATES PATENTS

| Number | Name | Date |
|---|---|---|
| 1,753,560 | Emmert | Apr. 8, 1930 |
| 1,900,603 | Gotthardt et al. | Mar. 7, 1933 |
| 2,194,912 | Regan | Mar. 26, 1940 |
| 2,298,704 | Knox | Oct. 13, 1942 |

FOREIGN PATENTS

| Number | Country | Date |
|---|---|---|
| 465,002 | Great Britain | Apr. 29, 1937 |